June 29, 1965  C. H. SMART  3,191,631
FLEXIBLE HOSE
Filed May 6, 1963  2 Sheets-Sheet 2
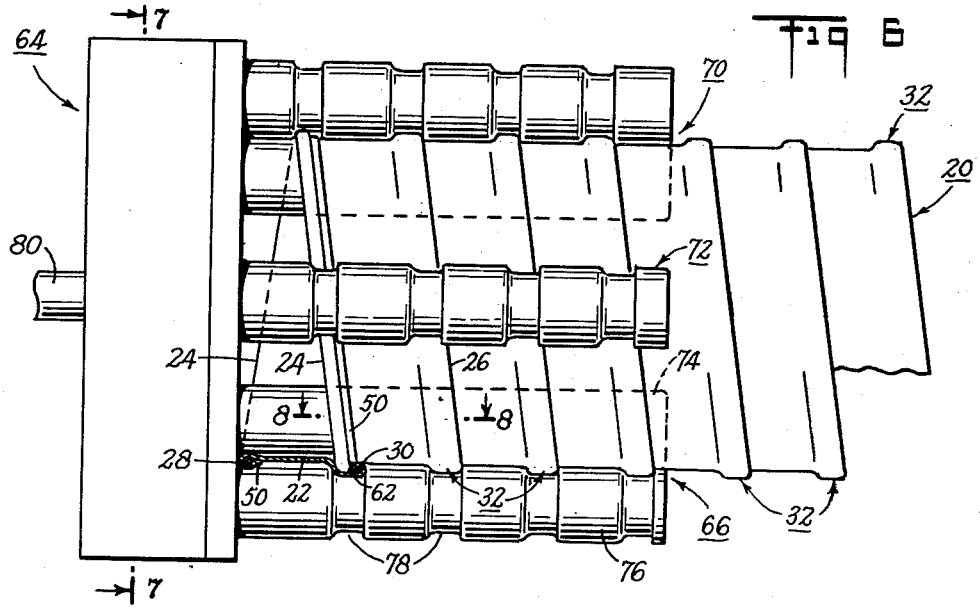
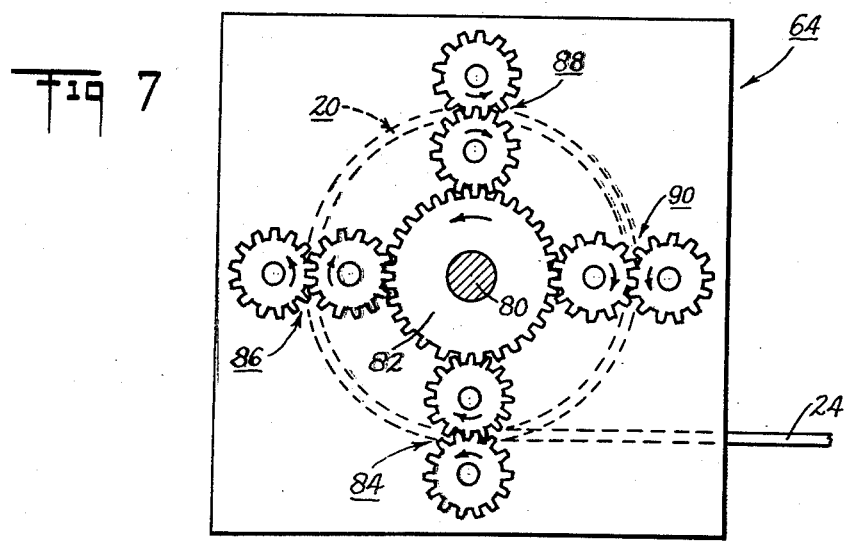
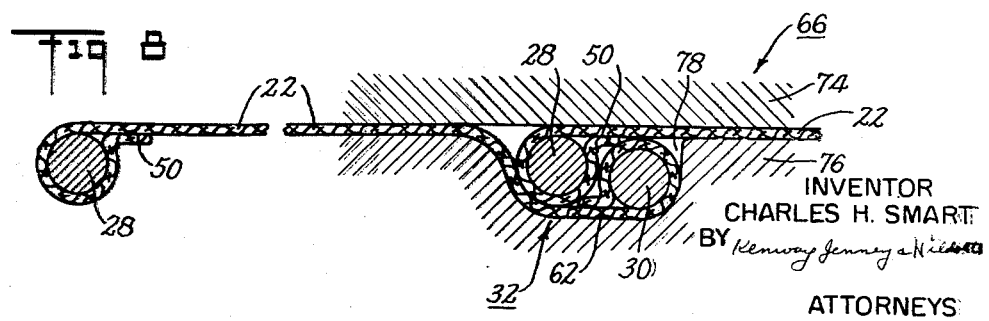
INVENTOR
CHARLES H. SMART
BY Kenway, Jenney & Hildreth
ATTORNEYS United States Patent Office 3,191,631
Patented June 29, 1965

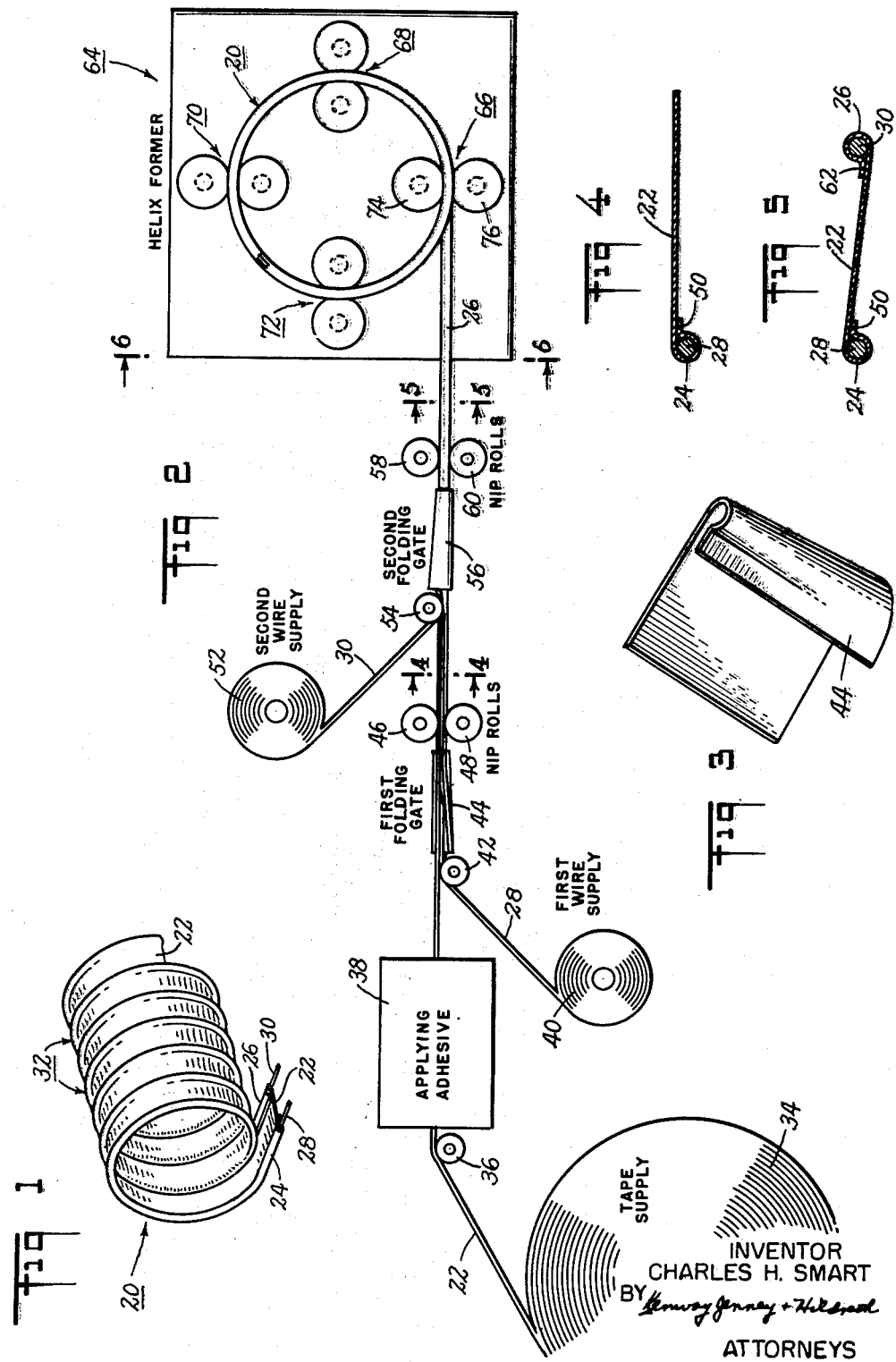

3,191,631
FLEXIBLE HOSE
Charles H. Smart, Amesbury, Mass., assignor to Callahan Mining Corporation, New York, N.Y., a corporation of Arizona
Filed May 6, 1963, Ser. No. 278,369
8 Claims. (Cl. 138—129)

This invention relates to flexible hose formed of adhesive-coated tape wound in a helix with overlapping edges. More particularly, the present invention contemplates an improved form of wire-reinforced flexible hose of the type disclosed in United States Patent No. 2,674,296 issued to R. G. Bringolf on April 6, 1954.

The tape from which the flexible hose of the type disclosed in the Bringolf patent is formed is continuous, ribbon like, flexible, and adhesive and is reinforced with wire along one edge. The flexible hose made from this tape comprises a series of helical overlapping loops held together by the adhesive character of the tape. Apparatus for making this hose is disclosed in the Bringolf patent. This apparatus includes a pair of forming rollers, at least one of which included spaced annular grooves. One end of the rollers are supported in cantilever bearings, and the other ends are free. The wire reinforced tape is fed between the nip of the rollers, looped back so that the end of the tape is re-fed through the rollers to overlap the edge of the tape entering the machine. The forming rollers exert pressure on the overlapping edges of the tape causing them to adhere to each other. Thus, when the rollers are continuously driven, a helical-form continuous hose is generated and feeds along parallel to the axes of the rollers.

It is an object of the present invention to provide helical-form hose of greater flexibility than that of the prior art.

Another object of the invention is to provide a helical-form flexible hose of the above character of the same strength or stronger than equivalent hose of the prior art.

Still another object of the invention is to provide helical-form flexible hose of the above character of smaller wall thickness than equivalent hose of the prior art.

Yet another object of the invention is to provide a helical-form flexible hose of the above character which may be manufactured by methods and machines of the prior art.

A further object of the invention is to provide a helical-form flexible hose of the above character having inner and outer walls that are resistant to abrasion.

Other objects of the invention will in part be obvious and will in part appear hereinafter.

The invention accordingly comprises an article of manufacture possessing the features, properties, and relation of elements, which will be exemplified in the article hereinafter described, and the scope of the invention will be indicated in the claims.

For a fuller understanding of the nature and objects of the invention, reference should be had to the following detailed description taken in connection with the accompanying drawings, in which:

FIGURE 1 is a perspective view of a section of helical-form flexible hose according to the preferred embodiment of the present invention;

FIGURE 2 is a side view of apparatus for continuously forming the flexible hose of FIGURE 1;

FIGURE 3 is a perspective view of a portion of the apparatus shown in FIGURE 2;

FIGURE 4 is a cross sectional view taken along the line 4—4 of FIGURE 2;

FIGURE 5 is a cross sectional view taken along the line 5—5 of FIGURE 2;

FIGURE 6 is a partial cross sectional view taken along the line 6—6 of FIGURE 2;

FIGURE 7 is a partial cross sectional view taken along the line 7—7 of FIGURE 6; and FIGURE 8 is a cross sectional view taken along the line 8—8 of FIGURE 6.

The same reference characters refer to the same parts throughout the several views of the drawings.

The helical-form flexible hose of the present invention has closely adjacent interlocked reinforcement wires along the two edges of the tape from which the hose is formed. Preferably the tape is wrapped around the reinforcement wires in the same direction so that the edges of the tape are concealed within the seam of the hose.

The preferred method for manufacturing helical-form flexible hose of the present invention is described in the co-pending application of Romeo G. Lariviere Serial No. 278,370, filed May 6, 1963, entitled Method and Apparatus For Continuously Forming Flexible Hose. The method generally comprises reinforcing the tape from which the hose is manufactured along both of its edges with wire in the same manner one edge of the tape is reinforced according to the prior art, as illustrated in the Bringolf patent. The tape is then formed into a helix with its edges overlapping and the two reinforcing wires interlocked to form a strong flexible joint. The edges of the tape are preferably also adhered together during the forming operation.

Apparatus for manufacturing the hose of the present invention is also described in the above identified Lariviere application. This apparatus generally comprises a pair of folding gates for folding each edge of an adhesive tape about a reinforcing wire and a device for then forming the tape into a helix so that its wire reinforced edges overlap, interlock and adhere together. The helix former preferably comprises a plurality of identical pairs of forming rollers spaced at equal angles about the surface of the hose being formed thereon.

More specifically, referred to FIGURE 1, the flexible hose 20 of the present invention is formed of an elongated helically wound flexible tape 22. The edges 24 and 26 of the tape 22 are reinforced with wires 28 and 30 respectively. The edges 24 and 26 of the tape 22 overlap so that the two helixes formed of wires 28 and 30 are adjacent and interlock at the helical seam, generally indicated at 32.

The interlocked wires 28 and 30 form an extremely flexible strong seam 32. The interlocked wires strongly resist forces tending to pull apart the seam 32. The cross sectional area of the reinforcing wires 28 and 30 are preferably chosen to be each one half that of the single wire used for hose of the same specifications of the prior art. Thus the more flexible hose of the present invention has at least the same resistance to crushing as that of the prior art. Furthermore, since the two wires 28 and 30 have a smaller diameter than the equivalent single wire of the prior art, the thickness of the wall of the hose 20 at the seam 32 is smaller than that of the prior art. Thus, for a given inside diameter requirement, the hose 20 of the present invention will have a smaller outside diameter than equivalent hose of the prior art.

The tape 22 may be of any flexible strong material used in the prior art such as a neoprene coated nylon fabric or the like. Preferably the abutting edges of the tape 22 at the seam 32 are adhered together so that no movement is possible between the adjacent turns of the tape 22 at seam 32.

Referring to FIGURE 2, the hose 20 of the present invention may be manufactured in the following manner. The tape 22 is supplied from a large tape supply reel 34. The tape passes over guide roller 36 into conventional adhesive applying apparatus 38 where adhesive is applied to both sides of both edges of the tape 22 for reasons that will be apparent from further discussion of the apparatus of FIGURE 2.

Wire 28 is drawn from a first wire supply 40 around guide roller 42 into juxtaposition with tape 22. The tape 22 and wire 28 then pass through a first folding gate 44 where the edge 24 of the tape is folded about wire 28.

FIGURE 3 is a perspective view of folding gate 44, which is of conventional design.

After passing through folding gate 44 the tape 22 and wire 28 pass through a pair of rollers or nippers 46 and 48 which resiliently press the overlapped portions 50 of the tape together (FIGURE 4) so that they adhere.

Wire 30, supplied from a second wire supply 52, passes over guide roller 54 into juxtaposition with the tape 22. Wire 30 and tape 22 then pass through a second folding gate 56 identical to the first folding gate 44 so that the edge 26 of the tape 22 is rolled about wire 30 in the manner shown in FIGURE 5. The tape 22 and wire 30 then pass through nippers 58 and 60 similar to nippers 46 and 48 which compress the adjacent portions of the tape 62 (FIGURE 5) together so that they adhere.

If desired the first and second folding gates 44 and 56 might be juxtaposed so that the edges 24 and 26 of the tape 22 would be folded about wires 28 and 30 simultaneously.

The tape 22 together with the reinforcing wires 28 and 30 is then passed into a helix former generally indicated at 64.

Helix former 64 comprises four pairs of forming roller 66, 68, 70 and 72 spaced at 90 degree angles about the circumference of the hose 20 being formed. The wire reinforced tape 22 is first fed to the nip of forming rollers 66 then to the nips of rollers 68, rollers 70, and rollers 72 and then again to the nip of rollers 66 where the edges 24 and 26 of the tape 22 overlap and the wires 28 and 30 interlock to form hose 20 as shown in FIGURE 1. Now referring to FIGURES 6 and 8, the first forming rollers 66 comprise a smooth cylindrical inner-roller 74 and a generally cylindrical outer roller 76. Outer roller 76 has a plurality of identical annular grooves 78.

As best seen in FIGURE 8, rollers 74 and 76 have a clearance between them substantially equal to the thickness of the tape 22, and the grooves 78 in the roller 76 have a depth measured from the surface of roller 74 approximately equal to the diameter of wires 28 and 30 plus the thickness of three additional layers of the tape 22. If the overlap portions 50 and 62 are extended in length however, the distance between the base of groove 78 and the facing roller surface is approximately equal to the diameter of the wires plus four tape thicknesses. The inner rollers of the other sets of rollers 68, 70 and 72 are also smooth and the outer rollers grooved as is roller 76. Thus, the rollers 66, 68, 70 and 72 are adapted to squeeze the seam 32 and the grooves therein exert a camming action due to their sloping sidewalls to squeeze wires 28 and 30 together to cause all adjacent portions of seam 32 to adhere together.

Again referring to FIGURE 6, the grooves 78 are spaced apart a distance equal to the pitch of the helix of the hose 20 being formed. The grooves in outer rollers of the other sets of forming rollers 68, 70 and 72 are all spaced apart a distance equal to the pitch of the helix of the hose 20 being formed, and are also axially displaced or offset successively from each other by one quarter of this distance, so as to accept the seam 32 and guide it in a helix as the hose 20 is formed.

The four sets of forming rollers 66, 68, 70 and 72 are preferably driven by a single drive shaft 80 connected to a prime mover (not shown).

Now referring to FIGURE 7, drive shaft 80 drives a synchronizing drive gear 82 in a counterclockwise direction as shown in FIGURE 7. Drive gear 82 drives four pairs of equal diameter gears 84, 86, 88 and 90 mounted on the ends of the pairs of forming rollers 66, 68, 70 and 72 respectively. Thus, the forming rollers are all driven at the same speed.

The hose 20 of the present invention could be formed on apparatus of the type disclosed in United States Patent No. 2,759,521 issued to J. T. Hall et al., on August 21, 1956. If desired, both rollers of each pair of forming rollers 66, 68, 70 and 72 may be grooved as are the forming rollers of the Hall patent. It is also contemplated that the tape 22 could be folded about the wires 28 and 30 so that the overlapped portions 50 and 62 are on the same side of the tape rather than on opposite sides, as shown in FIGURE 5.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herin described and all statements of the scope of the invention, which as a matter of language, might be said to fall therebetween.

Having described my invention, what I claim as new and desire to secure by Letter Patent is:

1. A flexible hose comprising:
    (A) an elongated tape;
    (B) the long edges of said tape being thicker than the middle portion thereof;
    (C) said tape being formed in a helix;
    (D) the long edges of said tape being overlapped; and
    (E) the thicker edge portions of each loop of said tape being in contact with the middle portions of adjacent loops of said tape.

2. The hose defined in claim 1 wherein the portions of adjacent loops of said tape that are in contact are adhered together.

3. The hose defined in claim 1 wherein the thicker edges of said tape are substantially more rigid than the middle portion thereof.

4. A flexible hose comprising, in combination:
    (A) an elongated flexible tape;
    (B) first and second relatively stiff wires;
    (C) one long edge of said tape being wrapped about said first wire;
    (D) the other long edge of said tape being wrapped about said second wire;
    (E) said tape and said wires being formed in three helixes of substantially equal pitch and diameter and having a common axis;
    (F) the edges of adjacent loops of said tape being overlapped; and,
    (G) the helixes of said first and said second wires being interlocked.

5. The combination defined in claim 4 wherein the adjacent edges of said tape are adhered together.

6. The combination defined in claim 4 wherein said wires are metal.

7. The combination defined in claim 4 wherein said tape takes the form of an elongated "S" and the edges thereof are concealed between the interlocked wires of adjacent loops of said tape.

8. A flexible hose comprising, in combination:
    (A) an elongated flexible tape;
    (B) first and second relatively stiff metallic wires;
    (C) one long edge of said tape wrapped about said first wire in the form of a "U";

(D) the other long edge of said tape wrapped about said second wire in the form of a "U";
(E) said tape being in the form of an elongated "S";
(F) the edges of said tape each being adhered to the middle portion of said tape;
(G) said tape and said wires formed in three helixes of substantially common pitch, diameter and axis;
(H) the edges of adjacent loops of said tape being overlapped; and,
(I) the helixes of said first and second wires being interlocked.

References Cited by the Examiner
UNITED STATES PATENTS
2,486,387  11/49  Bringolf _____ 138—122

FOREIGN PATENTS
511,822  6/52  Belgium.
446,351  1/48  Canada.
1,003,521  2/57  Germany.
554,977  1/57  Italy.

EDWARD V. BENHAM, *Primary Examiner.*